United States Patent
Duerr et al.

(10) Patent No.: US 10,308,820 B2
(45) Date of Patent: Jun. 4, 2019

(54) PAINT SYSTEM CONTAINING ANTI-FOULING METAL OXIDE AND FUMED SILICA

(71) Applicant: Evonik Degussa GmbH, Essen (DE)

(72) Inventors: Georg Duerr, Frankfurt (DE); Magdalena Kern, Alzenau (DE); Ruediger Mertsch, Wiesbaden (DE); Juergen Meyer, Stockstadt (DE); Guenther Michael, Karlstein (DE); Juri Tschernjaew, Aschaffenburg (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/558,241

(22) PCT Filed: Mar. 10, 2016

(86) PCT No.: PCT/EP2016/055180
§ 371 (c)(1),
(2) Date: Sep. 14, 2017

(87) PCT Pub. No.: WO2016/146484
PCT Pub. Date: Sep. 22, 2016

(65) Prior Publication Data
US 2018/0100071 A1    Apr. 12, 2018

(30) Foreign Application Priority Data
Mar. 18, 2015 (DE) .................. 10 2015 204 896

(51) Int. Cl.
| | | |
|---|---|---|
| C08K 3/22 | (2006.01) | |
| C08K 3/36 | (2006.01) | |
| C09D 5/00 | (2006.01) | |
| C09D 5/16 | (2006.01) | |
| C09D 7/61 | (2018.01) | |

(52) U.S. Cl.
CPC ............ *C09D 5/1618* (2013.01); *C09D 5/00* (2013.01); *C09D 7/61* (2018.01); *C08K 3/22* (2013.01); *C08K 3/36* (2013.01); *C08K 2003/2248* (2013.01)

(58) Field of Classification Search
CPC .......... C09D 5/00; C09D 5/1618; C09D 7/61; C08K 3/22; C08K 3/36; C08K 2003/2248
See application file for complete search history.

(56) References Cited

U.S. PATENT DOCUMENTS

| | | | | |
|---|---|---|---|---|
| 4,354,873 A | * | 10/1982 | Supcoe | ............... C09D 5/1675 |
| | | | | 106/18.32 |
| 2010/0025373 A1 | | 2/2010 | Barthel et al. | |
| 2014/0212467 A1 | | 7/2014 | Chen et al. | |
| 2015/0259542 A1 | | 9/2015 | Savin | |

FOREIGN PATENT DOCUMENTS

| | | | | |
|---|---|---|---|---|
| CN | 102408763 A | * | 4/2012 | |
| WO | 2008/058894 A1 | | 5/2008 | |
| WO | 2013/036746 A1 | | 3/2013 | |
| WO | 2014/055418 A1 | | 4/2014 | |
| WO | WO-2014055418 A1 | * | 4/2014 | .......... C09D 5/1618 |
| WO | 2014/187769 A1 | | 11/2014 | |
| WO | WO 2014/187769 A1 | | 11/2014 | |

OTHER PUBLICATIONS

Wacker Chemie AG, "HDK® H2000 Pyrogenic Silica", retrieved from Archive.org on Apr. 10, 2018, URL: https.web.archive.org/web/20140725080949/https:///wacker/com/cms/en/products/product/product/jsp?product=9324, (2014).*
Ram Charan Product Development Information sheet "Function of Fumed Silica (metal oxides) in coatings applications and selection criteria in various application", vol. 2, Issue 2, Jun. 2012.*
International Search Report dated Jun. 7, 2016 in PCT/EP2016/055180 filed Mar. 10, 2016.
Written Opinion dated Mar. 20, 2018 in Singapore Patent Application No. 11201707300S.

\* cited by examiner

*Primary Examiner* — Anthony J Green
(74) *Attorney, Agent, or Firm* — Oblon, McClelland, Maier & Neustadt, L.L.P.

(57) ABSTRACT

A paint system contains an anti-fouling metal oxide and a fumed silica, wherein the fumed silica has a BET surface area of 150 to 400 $m^2/g$, a tamped density of 100 to 300 g/l and a thickening of less than 500 mPas.

7 Claims, No Drawings

PAINT SYSTEM CONTAINING ANTI-FOULING METAL OXIDE AND FUMED SILICA

This application is a National Stage of PCT/EP2016/055180, which was filed on Mar. 10, 2016. This application is based upon and claims the benefit of priority to German Application No. 10 2015 204 896.9, which was filed on Mar. 18, 2015.

The invention relates to a paint system comprising an anti-fouling metal oxide and a fumed silica.

Anti-fouling coatings which comprise metal oxides are known. The main problem associated with the use of metal oxides is their exponential release. This entails a high required fraction of metal oxides in the paint on the assumption of a biologically active biocide concentration over the lifetime of the coating.

U.S. Pat. No. 7,147,921 proposes solving the release problem by encasing copper with a film of silicon dioxide. What is observed is in fact that in spite of the film of silicon dioxide, the release of the copper is undesirably rapid.

WO2013/036746 discloses core-shell particles wherein the core comprises copper and the shell consists of a porous layer of silicon dioxide. The shell is applied by wet-chemical means using a sodium silicate solution.

WO2014/187769 proposes core-shell particles whose shell consists essentially of particulate silicon dioxide having a thickness of 0.1 to 10 μm and whose core consists of an anti-fouling metal oxide with an average particle diameter of 1 to 20 μm. The bond of the shell to the core is a fixed bond. In the case of dispersion, no significant parting of this bond is observed. The core-shell particles can be produced by contacting a mixture of the core- and shell-forming materials with a specific energy input of 200 to 2000 kJ/kg. It is stated that, in the case of a specific energy input of less than 200 kJ/kg, a physical mixture of silicon dioxide particles and metal oxide particles is formed. It is stated that this mixture does not lead to reduced release of the anti-fouling material.

The technical problem addressed by this invention was therefore that of providing an alternative to the paint systems which contain core-shell particles and are known in the prior art, and which likewise have a reduced content of biocidal substances. A further technical problem was that of providing a simple process for producing a paint system.

The invention provides a paint system comprising an anti-fouling metal oxide and a fumed silica, where the fumed silica has
a BET surface area of 150 to 400 m²/g,
a tamped density of 100 to 300 g/l and
a thickening of less than 500 mPas at 25° C.

Fumed silicas are produced by flame hydrolysis of silicon compounds. In this process, a hydrolysable silicon compound is reacted in a flame formed by combustion of hydrogen and of an oxygen-containing gas. The combustion flame here provides water for the hydrolysis of the silicon halide, and sufficient heat for the hydrolysis reaction. This operation generally forms aggregates which form a three-dimensional network. A plurality of aggregates may form agglomerates. A fumed silica produced in this way is referred to as fumed or pyrogenic, hydrophilic silica. Silicas obtained directly from the flame process and having a BET surface area of 150 to 400 m²/g have a low tamped density and high thickening in paints. For instance, the tamped density is generally about 40 to 60 g/l and the thickening is more than 2500 mPas at 25° C. This fumed silica is unsuitable for the present invention. The silica present in the present invention has a high tamped density combined with low thickening.

In a preferred embodiment, the BET surface area is 180 to 330 m²/g, the tamped density is 150 to 250 g/l and the thickening is 250 to 400 mPas at 25° C.

The silica of the preferred embodiment can be produced, for example, by grinding the above-described silica obtained directly from the flame process.

The fumed silica present in the paint system may also be a hydrophobized silica. It can be produced by reacting a hydrophilic silica as obtained from the flame process with a hydrophobizing agent and then grinding it. Useful hydrophobizing agents are mainly organosilanes, haloorganosilanes, silazanes or polysiloxanes. Preference is given to using dimethyldichlorosilane, octyltrimethoxysilane, octyltriethoxysilane, hexamethyldisilazane, hexadecyltrimethoxysilane, hexadecyltriethoxysilane and dimethylpolysiloxane. According to the hydrophobizing agent used and the amount thereof, there remains a carbon content of 1% to 10% by weight on the hydrophobized silica. This hydrophobized silica too is subsequently ground.

In both cases, hydrophilic and hydrophobic silica, grinding requires a specific energy input of 200 to 2000 kJ/kg, preferably 500 to 1800 kJ/kg, most preferably 700 to 1500 kJ/kg. The specific energy input is calculated as follows: Specific energy input=$(P_D-P_{D,0})\times t/m$, with $P_D$=total power input, $P_{D,0}$=no-load power, t=energy input time, m=mass of silica used.

Energy input is at its optimum with an assembly having a power of at least 1 kW, preferably 1 to 20 kW, more preferably 2 to 10 kW. Preference is given to the use of a rotor ball mill. The grinding balls are preferably made of steel. When a rotor ball mill is used, $P_D$ relates to the total power input, i.e. inclusive of silica and grinding balls. $P_{D,0}$ describes the no-load power, i.e. without silica and grinding balls. The charging volume of the fumed silica in the rotor ball mill is preferably 10% to 80% by volume, preferably 20% to 50% by volume, based in each case on the volume of the rotor ball mill. The grinding time is preferably 0.1 to 120 minutes, more preferably 0.2 to 60 minutes, very preferably 0.5 to 10 minutes. In the course of grinding, it is possible to add up to 3% by weight of water, based on the amount of silica.

It has been found that this treatment step alters the aggregate structures and aggregate dimensions. The maximum aggregate diameter of such a ground silica is generally only 100 to 200 nm. Furthermore, the degree of branching and the number of primary particles per aggregate is reduced.

The table shows the data from an image analysis for about 2000 aggregates in accordance with ASTM D 3849 for the silica which is particularly suitable in the paint system according to the invention, after grinding, as compared with the unground silica.

TABLE

Aggregate structure and dimensions before/after grinding

|  |  | Silica before grinding | Silica after grinding |
|---|---|---|---|
| Area | nm² | 41111 | 13417 |
| Circumference | nm | 3002 | 947 |
| Convex circumference | nm | 1056 | 446 |
| Minimum diameter | nm | 244 | 107 |
| Maximum diameter | nm | 393 | 167 |

TABLE-continued

Aggregate structure and dimensions before/after grinding

| | | Silica before grinding | Silica after grinding |
|---|---|---|---|
| Free area | % | 26 | 38 |
| Degree of branching | | 13.2 | 5.29 |
| Number of primary particles/aggregate | | 584 | 167 |
| Aggregates circular | % | 0.09 | 0.34 |
| ellipsoidal | % | 4.23 | 30.3 |
| linear | % | 22.2 | 41.1 |
| branched | % | 72.6 | 28.0 |

The BET surface area is determined in accordance with DIN ISO 99277 and the tamped density in accordance with DIN EN ISO 787/11.

The thickening, in mPas, is determined in a dispersion of the silicon dioxide powder in an unsaturated polyester resin, such as cocondensates of ortho- or meta-phthalic acid and maleic acid or fumaric acid, or the anhydrides thereof, and a low molecular weight diol, for example ethylene glycol, propane-1,2- or -1,3-diol, butane-1,2- or -1,3- or -1,4-diol, neopentyl glycol (($CH_3$)$_2$C($CH_2$OH)$_2$), or polyols such as pentaerythritol, preferably dissolved in an amount of 30% to 80% by weight, preferably 60% to 70% by weight, in an olefinic reactive diluent as solvent, for example monostyrene. The viscosity of the polyester resin is 1300+/−100 mPas at a temperature of 22° C. 7.5 g of silicon dioxide powder are introduced into 142.5 g of polyester resin at a temperature of 22° C. and dispersed therein with a dissolver at 3000 $min^{-1}$. 60 g of this dispersion are admixed with a further 90 g of the unsaturated polyester resin and dispersal is repeated. Thickening refers to the viscosity value in mPas of the dispersion at 25° C., measured with a rotary viscometer at a shear rate of 2.7 $s^{-1}$. An example of a useful unsaturated polyester resin is Ludopal® P6, BASF.

The second essential component of the paint system according to the invention is an anti-fouling metal oxide. Anti-fouling means that this metal oxide is capable of retarding, containing or preventing surface colonization by animals, including microorganisms, and plants on objects to which the particles have been applied by coating, particularly for objects which are in contact with water, more particularly seawater.

The anti-fouling metal oxide is preferably selected from the group consisting of copper oxide, titanium dioxide, iron oxide, manganese oxide, vanadium oxide, tin oxide and zinc oxide. It is also possible that the paint system comprises two or more of these anti-fouling metal oxides. The best results are displayed by a paint system wherein the main constituent of the anti-fouling metal oxide is copper(I) oxide.

The anti-fouling metal oxide is preferably in spherical and/or spheroidal form and has a mean particle diameter of 1 to 20 μm. However, it is also possible to use other forms, for example acicular structures.

The best results are obtained when the diameter, or in the case of acicular the structures the longest side, of the anti-fouling metal oxide is greater than the mean aggregate diameter of the fumed silica. More preferably, a ratio of the diameters is 10 to 1000.

The proportion of anti-fouling metal oxide may be varied across broad limits. Preferably, the paint system includes 0.5% to 60% by weight of anti-fouling metal oxide.

The proportion of fumed silica in the paint system may also be varied across broad limits. However, it has been found that the paint system displays the best anti-fouling properties when the proportion of fumed silica is at least 3% by weight, better at least 5% by weight, based on the paint system. Particular preference is given to a range from 5% to 40% by weight. Such high proportions cannot be achieved with standard fumed silica as from the flame process because of the strong thickening effect thereof.

SEM images of a model paint system comprising $Cu_2O$ particles and a fumed ground silica show that the surface of the $Cu_2O$ particles is densely covered by fine fumed silica. These are not core-shell structures as described in the prior art, in which the shell is bonded to the core in a fixed manner. In the present case, electrostatic interactions if anything are assumed to be involved.

In general, the paint system according to the invention also comprises film-forming resins. Suitable polymers for this purpose are acrylates, silicone resins, polyesters, polyurethanes, and resins based on natural products. Preferably, the paint system comprises swellable or water-soluble resins, in order to facilitate release of the anti-fouling metal oxides. Swellable or water-soluble resins may be silyl acrylates or silyl methacrylates, such as tributylsilyl acrylate, triphenylsilyl acrylate, phenyldimethylsilyl acrylate, diphenylmethylsilyl acrylate, trimethylsilyl acrylate, triisopropylsilyl acrylate, or the corresponding methacrylates or metal acrylates. Rosin-based resins may also be part of the paint system according to the invention.

The invention further provides a substrate coated with the paint system. Suitable substrates include in principle all substrates, examples being those made of metal, plastic or glass fibre. The coating may be applied by means of known methods such as dipping, brushing, spraying or knife coating.

The present invention further provides for the use of the paint system for the coating of the aquatic region of a watersports boat, a commercial ship, or a built structure immersed in water, such as jetties, quay walls, oil drilling platforms, shipping channel markings or measurement probes.

The present invention allows the production of a paint system comprising an anti-fouling component and a specific fumed silica having high tamped density and low thickening. For the production, the components are stirred into the paint matrix with low energy input, for example by means of a dissolver. High energy inputs as described in the prior art are unnecessary.

EXAMPLES

TABLE 1

Feedstocks

| | | Silica | |
|---|---|---|---|
| | | 1 | 2 |
| BET surface area | $m^2$/g | 209 | 184 |
| Tamped density | g/l | 133 | 182 |
| Thickening (25° C.) | mPas | 330 | 290 |
| Carbon content | % by wt. | 0 | 1.2 |

Introduction of silica and copper(I) oxide into a rosin without antifouling metal oxide: initial introduction of 350 g of rosin and into a PE cup. Addition of 10%-25% xylene. Addition of silica 1 or silica 2 while stirring by means of a dissolver (disc Ø 50 mm). Dispersing by means of a dissolver for 15 min (disc Ø 50 mm, 3500 rpm).

Subsequently in a bead mill: 1400 g of Ce-stabilized zirconium oxide beads, 2-3 mm, 15 minutes, 2000 rpm, triple grinding disc, addition of copper(I) oxide. Dispersing at 2000 rpm with triple grinding disc for 5 min, then sieving-off of the beads.

Application by hand by means of a paint roller (short-pile (4 mm) velour paint roller, width 10 cm) to sanded PVC test panels (20×20 cm); dry layer thickness 100 μm

TABLE 2

Composition of the paints and assessment

|  |  | Example | | |
| --- | --- | --- | --- | --- |
|  |  | 1 | 2 | 3 |
| Silica 1 | % by wt. | 0 | 10 | 0 |
| Silica 2 | % by wt. | 0 | 0 | 10 |
| Cu$_2$O | % by wt. | 5 | 5 | 5 |
| Fouling rating[1] |  | 69 | 100 | 100 |

[1] Assessment of fouling according to ASTM 6990-03 after weathering for three months in the North Sea at Norderney (100: perfect, 0% failure; 0: complete failure)

The invention claimed is:

1. A pain system, comprising:
   an anti-fouling metal oxide; and
   a fumed, hydrophilic silica,
   wherein the fumed, hydrophilic silica has:
   a BET surface area of 150 to 400 m$^2$/g;
   a tamped density of 100 to 300 g/l; and
   a thickening of less than 500 mPas at 25° C.

2. The paint system according to claim 1, wherein the anti-fouling metal oxide is at least one selected from the group consisting of copper oxide, titanium dioxide, iron oxide, manganese oxide, vanadium oxide, tin oxide and zinc oxide.

3. The paint system according to claim 1, wherein a proportion of anti-fouling metal oxide is 0.5% to 60% by weight, based on a total weight of the paint system.

4. The paint system according to claim 1, wherein a proportion of fumed, hydrophilic silica is 5% to 40% by weight, based on a total weight of the paint system.

5. The paint system according to claim 1, further comprising:
   a film-forming resin.

6. A substrate coated with the paint system according claim 1.

7. A method of coating an article, said method comprising:
   applying the paint system according to claim 1 to the aquatic region of a watersports boat, a commercial ship or a built structure to be immersed in water.

* * * * *